Feb. 11, 1936.  H. D. GEYER  2,030,788
RESILIENT UNIVERSAL JOINT
Filed Sept. 15, 1933
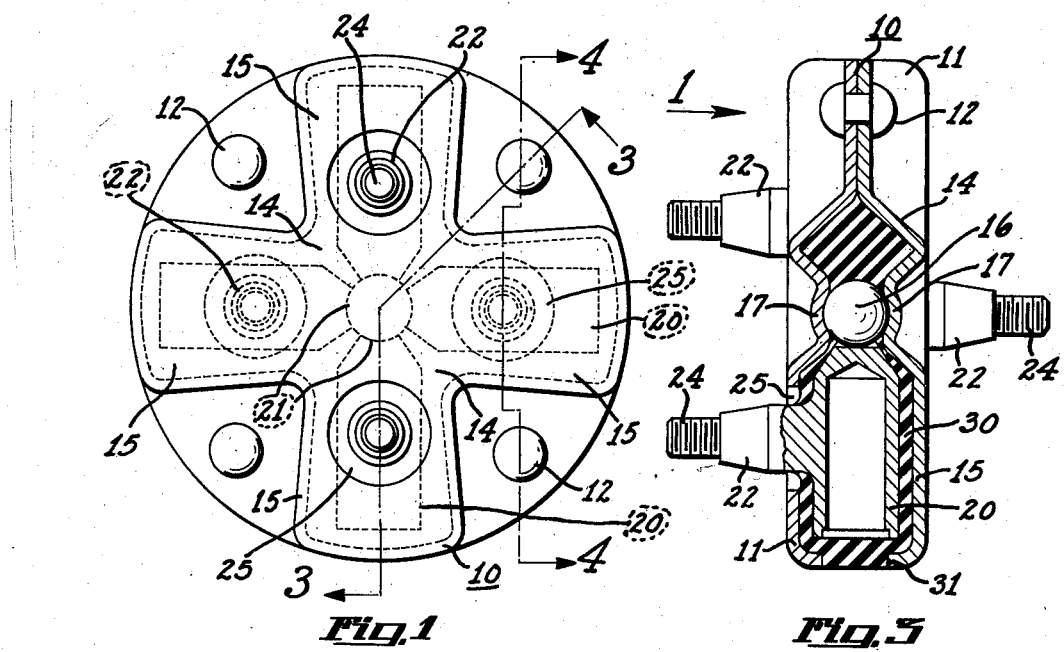
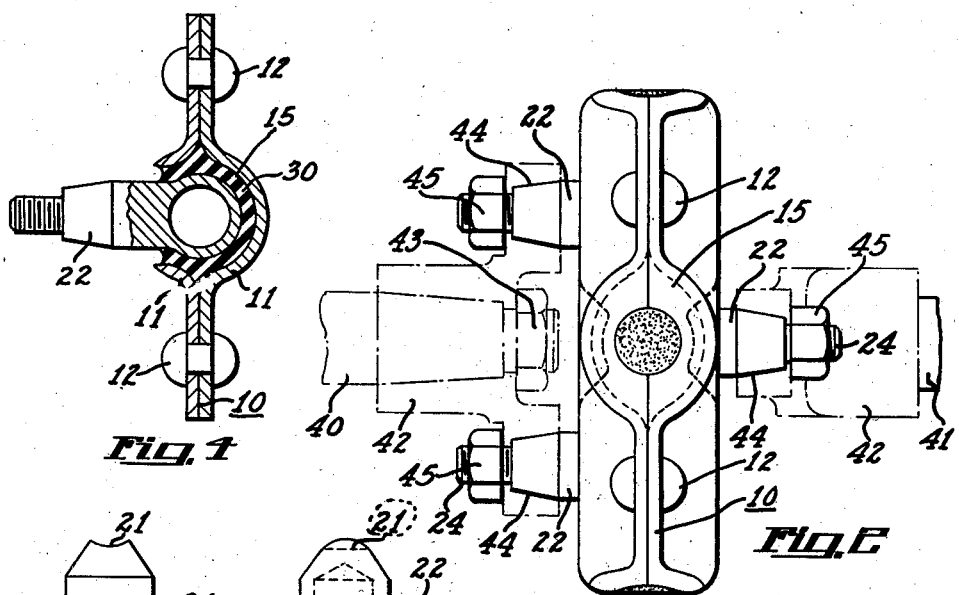
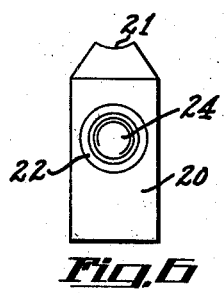
INVENTOR
Harvey D. Geyer
BY
Spencer Hardman & Fehr
his ATTORNEYS Patented Feb. 11, 1936

2,030,788

UNITED STATES PATENT OFFICE 2,030,788

RESILIENT UNIVERSAL JOINT

Harvey D. Geyer, Dayton, Ohio, assignor, by mesne assignments, to General Motors Corporation, Detroit, Mich., a corporation of Delaware Application September 15, 1933, Serial No. 689,641

8 Claims. (Cl. 64—14)

This invention relates to universal joints such as are adapted for use on automobile propeller shafts and the like.

An object of this invention is to provide a simple and efficient universal joint which will require no lubrication and give long wear without attention.

Another object is to provide such a universal joint containing resilient non-metallic material, such as resilient rubber, which will cushion any sudden shocks in the torque transmitted thereby.

Another object is to provide a universal joint which will greatly reduce or prevent the transmission of sound or other vibrations therethrough.

Further objects and advantages of the present invention will be apparent from the following description, reference being had to the accompanying drawing, wherein a preferred embodiment of one form of the present invention is clearly shown.

In the drawing:

Fig. 1 is a face elevation, looking in direction of arrow 1 of Fig. 3, of an automobile propeller shaft universal joint made according to this invention.

Fig. 2 is a side elevation and shows the joint connected to the adjacent ends of two shafts.

Fig. 3 is a section on line 3—3 of Fig. 1.

Fig. 4 is a section on line 4—4 of Fig. 1.

Fig. 5 is a side elevation of one of the trunnions.

Fig. 6 is a view looking in direction of arrow 6 of Fig. 5.

Similar reference characters refer to similar parts throughout the several views.

10 designates as a whole the metal housing, which is made in two halves 11 secured together by the four rivets 12. The halves 11 are so shaped that when assembled together they provide four 90 degree radially extending sockets 15 in a single plane, said sockets 15 interconnecting with one another on the radii 14 at the central portion of housing 10 as clearly shown in Figs. 1 and 3. A spherical steel ball 16 is held in place at the exact center of housing 10 by the two spherical seats 17 on the housing halves 11.

A steel trunnion 20 is located in and substantially aligned with each radial socket 15, each trunnion 20 having a cylindrical bearing surface 21 bearing upon the central ball 16 as shown in Figs. 1 and 3. Each trunnion 20 has an integral laterally projecting stud 22 projecting through the enlarged holes 25 in housing 10, the one pair of axially aligned trunnions 20 having their studs 22 projecting through one side of housing 10 while the other pair of axially aligned trunnions having their studs 22 projecting through the opposite side of housing 10. Resilient rubber 30 or other suitable non-metallic material, fills the space between the trunnions 20 and the housing sockets 15 and is held in non-slipping relation to these metal parts. Preferably this resilient rubber 30 is vulcanized in situ and is thus bonded by vulcanization to the trunnions 20, the housing 10 wherever it contacts same, and to small areas of the central ball 16. This may be done by first assembling all these parts with the uncured rubber blanks inserted in place therebetween and inserting the assembly in a vulcanizing mold. The trunnions 20 may be held properly located relative to housing 10 during vulcanization by the studs 22 which will fit tight within suitable holes provided therefor in the mold. The mold will also have annular portions fitting snugly into the annular openings 25 around studs 22 and thus confine the rubber 30 at these openings during vulcanization. Other parts of the mold will confine the rubber at the peripheral openings 31 in housing 10 opposite the ends of trunnions 20 (see Fig. 3), or if desired the openings 31 may be omitted. It will thus be seen that this form of the invention lends itself admirably to vulcanizing the resilient rubber 30 in situ with all the parts first assembled together as a unit, thus greatly simplifying the manufacture of the universal joint and reducing the cost thereof. Since the rubber is bonded by vulcanization to the trunnions 20 and housing 10 all relative movement between these parts during operation of the joint will be taken by internal distortion in the rubber rather than by any slipping of the rubber on these metal parts.

This universal joint unit is connected to the adjacent ends of the shafts 40 and 41 as clearly shown in Fig. 2. Each shaft has a flanged fitting 42 rigidly fixed thereto by suitable means, as by the nut 43. The pair of parallel studs 22 on each side of the joint unit are inserted through tapered holes 44 in the two fittings 42 and drawn up tight therein by the nuts 45 on the threaded ends 24 of studs 22. Thus the two pairs of aligned trunnions 20 are rigidly fixed to the two shafts respectively and in all cases move therewith.

In operation, power torque is resiliently transmitted through the universal joint by the direct compression of the resilient rubber sleeves 30 enclosing the trunnions 20. Since a relatively large area of rubber is in direct compression large power torque may be easily transmitted without great stress and excessive bulging of the rubber.

Universal movement between the connected shafts 40 and 41 is permitted by a rotary movement of each pair of aligned trunnions 20 relative to the housing 10, this rotary movement being permitted by an internal distortion or twist in the resilient rubber sleeves 30 without any slipping of the rubber upon the metal surfaces due to the vulcanized bond therewith. Thus all surface wear is avoided.

During operation the center line of both shafts 40 and 41 must always pass through the center of the ball 16 due to the curvature of the bearing surfaces 21 on the inner ends of trunnions 20. This will be clear from Fig. 1, it being obvious from viewing this figure that neither pair of relatively fixed trunnions 20 can be translated laterally relative to ball 16. However since bearing surfaces 21 are cylindrical in the axial direction of the connected shafts, each pair of relatively fixed trunnions 20 may slide a small distance upon ball 16 in an axial direction of the shafts. Such axial sliding of trunnions 20 upon ball 16 is of course resiliently opposed by a direct compression of the rubber sleeves 30, as will be obvious from viewing Fig. 3. Hence this feature enables the universal joint to transmit axial thrusts in the connected shafts in a cushioned manner and yet at all times cause the center lines of the two shafts to intersect at the center of ball 16, regardless of any angularity which may obtain between the two connected shafts.

While the form of embodiment of the present invention as herein disclosed, constitutes a preferred form, it is to be understood that other forms might be adopted, all coming within the scope of the claims which follow.

What is claimed is as follows:

1. A resilient universal joint comprising: four trunnions lying substantially in a plane and arranged radially 90 degrees apart, each of said trunnions having a lateral projection rigid therewith, two of said projections on aligned trunnions projecting from one side of said plane and the other two projections projecting from the opposite side of said plane, a metal housing encasing said four trunnions in spaced relation therewith and having holes in each opposed side thereof through which said projections project without normally contacting said housing, a central metal ball adapted to bear upon the inner ends of said four trunnions, and resilient non-metallic material separating said trunnions and housing.

2. A resilient universal joint comprising: a metal housing having two metal halves rigidly fixed together and forming a chamber therebetween of two elongated recesses crossing each other at right angles, a pair of opposed and aligned metal trunnions in each of said elongated recesses and spaced from the walls thereof, an integral molded resilient rubber-like member filling the spaces between said trunnions and recess walls and isolating same, a central metal ball held in position by said housing and adapted to bear upon the inner ends of said four trunnions, and means for rigidly fixing the two pairs of aligned trunnions to the adjacent ends of two aligned shafts respectively.

3. A resilient universal joint comprising: a metal housing having two metal halves rigidly fixed together and forming a chamber therebetween of two elongated recesses crossing each other at right angles, a pair of opposed and aligned metal trunnions in each of said elongated recesses and spaced from the walls thereof, resilient non-metallic material filling the spaces between said trunnions and recess walls and isolating same, a central metal ball held in position at the center of said housing and adapted to bear upon the inner ends of said four trunnions, each of said trunnions having a lateral projection, the two projections on each pair of trunnions projecting through holes in said housing respectively with sufficient clearance for a relative pivoting of said housing upon each pair of trunnions, and means for fixing the outer ends of said two pairs of projections rigidly to the adjacent ends of two aligned shafts respectively.

4. A universal joint adapted to connect two shafts, comprising: a yoke member adapted to be rigidly attached to one shaft end and having substantially aligned radial projections, a second yoke member adapted to be rigidly attached to the second shaft end and having substantially aligned radial projections, central means interposed between the radially spaced inner ends of said two pairs of substantially aligned projections and arranged to positively prevent relative lateral movement between said pairs, and a frame member having resilient non-metallic pivot mountings for said two pairs of projections.

5. A universal joint adapted to connect two shafts, comprising: a yoke member adapted to be rigidly attached to one shaft end and having two radial substantially aligned projections, a second yoke member adapted to be rigidly attached to the second shaft end and having two radial substantially aligned projections, the inner ends of said four projections each having an axially extending cylindrical surface, a central metal ball bearing upon the cylindrical inner end of each of the radially spaced inner ends of said two pairs of substantially aligned projections and arranged to positively prevent relative lateral movement between said pairs but permitting axial movement therebetween, and a frame member having resilient non-metallic pivot mountings for said two pairs of projections.

6. A universal joint adapted to connect two shafts, comprising: a yoke member adapted to be rigidly attached to one shaft end and having substantially aligned radial projections, having their inner ends spaced apart radially, a second yoke member adapted to be rigidly attached to the second shaft end and having substantially aligned radial projections having their inner ends spaced apart radially, a central pivot means bearing upon said two pairs of radially spaced inner ends in such manner as to positively prevent relative lateral displacement of the connected shafts, and a frame member having resilient non-metallic pivot mountings for said two pairs of projections.

7. A universal joint adapted to connect two shafts, comprising: a yoke member adapted to be rigidly attached to one shaft end and having substantially aligned radial projections, having axially extending cylindrical inner ends spaced apart radially, a second yoke member adapted to be rigidly attached to the second shaft end and having substantially aligned radial projections having axially extending cylindrical inner ends spaced apart radially, a central pivot ball bearing upon said two pairs of radially spaced inner ends in such manner as to positively prevent relative lateral displacement of the connected shafts, but permit relative axial displacement thereof, and a frame member having pivot sockets therein within which said four projections are pivotally mounted.

8. A universal joint member adapted to be connected to fittings at opposed ends of two shafts, comprising: four trunnions lying substantially in a plane transverse the joint axis and arranged radially 90 degrees apart, each trunnion having a separate axially projecting stud rigid therewith, the two separate studs of one pair of aligned trunnions extending in parallel and radially spaced relation from one side of said transverse plane and the other two separate studs of the other pair of aligned trunnions similarly extending from the opposite side of said transverse plane, a metal housing encasing said four trunnions in spaced relation therewith and having two radially spaced holes, in each opposed side thereof through which said radially spaced studs individually project with normally substantial clearance, and resilient rubber substantially filling the space between said housing and trunnions and extending around said studs closely adjacent the four clearance holes therefor in said housing.

HARVEY D. GEYER.